United States Patent

Nonaka

[11] Patent Number: 5,769,053
[45] Date of Patent: Jun. 23, 1998

[54] ENGINE TRANSIENT CONTROL SYSTEM

[75] Inventor: Kimihiro Nonaka, Hamamatsu, Japan

[73] Assignee: Sanshin Kogyo Kabushiki Kaisha, Hamamatsu, Japan

[21] Appl. No.: 588,544

[22] Filed: Jan. 18, 1996

[30] Foreign Application Priority Data

Jan. 20, 1995 [JP] Japan .................................... 7-007531

[51] Int. Cl.⁶ ...................................................... F02P 5/15
[52] U.S. Cl. .......................................... 123/417; 123/418
[58] Field of Search ..................................... 123/416, 417, 123/418, 676

[56] References Cited

U.S. PATENT DOCUMENTS

| | | | |
|---|---|---|---|
| 4,528,956 | 7/1985 | Ogata et al. | 123/418 |
| 4,658,785 | 4/1987 | Naganawa et al. | 123/418 |
| 5,020,501 | 6/1991 | Cao et al. | 123/418 |
| 5,148,791 | 9/1992 | Nagano et al. | 123/417 |
| 5,215,068 | 6/1993 | Kato | 123/676 |
| 5,383,432 | 1/1995 | Cullen et al. | 123/417 |
| 5,448,975 | 9/1995 | Sato | 123/417 |
| 5,517,968 | 5/1996 | Hori et al. | 123/417 |
| 5,558,062 | 9/1996 | De Minco et al. | 123/417 |

Primary Examiner—Willis R. Wolfe
Attorney, Agent, or Firm—Knobbe, Martens, Olson & Bear LLP

[57] ABSTRACT

A feedback control system for an internal combustion engine and in the illustrated embodiment an outboard motor. In order to maintain the desired air-fuel ratio, a air-fuel ratio sensor is employed and changes the air-fuel ratio to maintain the desired air-fuel ratio through a feedback control system. In order to minimize fluctuations in engine speed during changes in air-fuel ratio, the timing of the firing of the spark plugs of the engine is varied. The amount of adjustment in spark timing depends on one or more of a variety of parameters, such as engine speed, engine intake air flow, and exhaust system back pressure. In addition, at least one cylinder may be adjusted differently from the other cylinders to compensate for the different conditions existent in the cylinders.

29 Claims, 8 Drawing Sheets

ENGINE TRANSIENT CONTROL SYSTEM

BACKGROUND OF THE INVENTION

This invention relates to an engine control system and more particularly to an improved feedback control system for an engine that improves performance under transient conditions.

In the interest of promoting not only fuel economy, but also exhaust emission control, there have been proposed a number of engine control systems and methods wherein a combustion condition sensor is supplied in the engine and which senses the actual air-fuel ratio consumed by the engine. When this sensor detects that the air-fuel ratio is less than that desirable for the actual running conditions, an adjustment is made in the air-fuel ratio so as to bring the actual running ratio into the desired target range.

Although a wide variety of types of engine combustion condition sensors are employed, one of the most frequently used types of sensors is an oxygen ($0_2$) sensor. This type of sensor is positioned in the exhaust system. By sensing the amount of oxygen present in the exhaust gases, it is possible to determine the air-fuel ratio. This is particularly true if it is desired to sense whether the ratio is stoichiometric or not. Although these systems are generally quite effective in producing the desired result, there is a difficulty that arises in connection with certain characteristics of the their performance.

As has been previously noted, in order to maintain the desired air-fuel ratio, it is necessary during even constant running conditions to vary the air-fuel ratio, depending upon the actual conditions in the engine. However, when the air-fuel ratio is changed, then there is a tendency for the engine speed to also be changed. This can produce not only a disconcerting effect on the operator, but also adversely effects performance. In addition, the operator may tend to compensate by changing the position of the throttle control, and this is not desirable because it can result in further hunting.

It is, therefore, a principal object of this invention to provide an improved engine feedback control system and method.

It is a further object of this invention to provide an engine feedback control system and method which is effective to maintain the desired air-fuel ratio and which will minimize the effects of the change in ratio on the actual speed of the engine.

SUMMARY OF THE INVENTION

This invention is adapted to be embodied in an internal combustion engine and control system and operational method therefor. The engine is formed with at least one combustion chamber. An air-fuel charging system supplies an air-fuel charge to the combustion chamber for combustion therein. A spark plug has a gap which extends into the combustion chamber and is fired by an ignition control system that includes timing means for firing the spark plug at a time dependent upon at least one engine condition for initiating combustion in the combustion chamber. An exhaust port is provided for discharging combustion products to the atmosphere. An exhaust system communicates the exhaust port with the atmosphere for discharging the exhaust gases to the atmosphere. A combustion condition sensor is provided for sensing the air-fuel ratio supplied to the combustion chamber by the air-fuel charging system. A feedback control system adjusts the air-fuel ratio, depending upon the output of the sensor and when the output indicates that the air-fuel ratio deviates from the desired air-fuel ratio.

In accordance with a system for practicing the invention, a further control is provided for changing the timing of the spark plug when the air-fuel ratio is changed so as to minimize the fluctuations in engine speed.

In accordance with a method for practicing the invention, when the control alters the air-fuel ratio, the timing of firing of the spark plug is also altered so as to minimize the fluctuations in engine speed.

DETAILED DESCRIPTION OF THE PREFERRED EMBODIMENTS OF THE INVENTION

Figure 1:
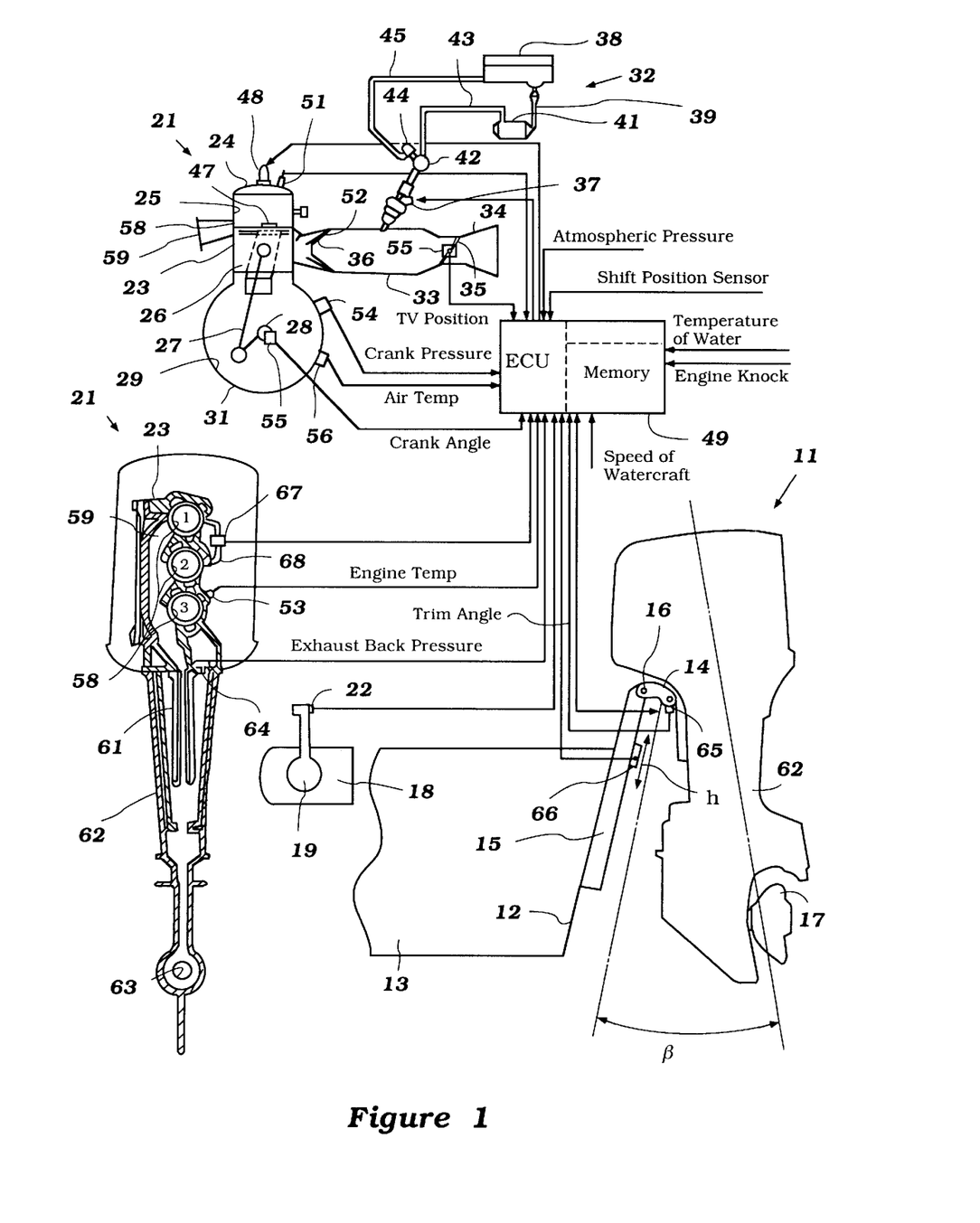
FIG. 1 is a composite view consisting of, at the bottom, right-hand side, a partial side elevational view of an outboard motor and accompanying watercraft to which it is attached and which is constructed and operated in accordance with an embodiment of the invention. The lower, left-hand view of this figure is a cross-sectional view taken generally along the line A—A of the remaining view. This remaining, upper view is a partially schematic cross-sectional view taken through a single cylinder of the engine showing the components associated with the control system.

Referring now in detail to the drawings and initially primarily to FIG. 1, an outboard motor constructed and operated in accordance with an embodiment of the invention is identified generally by the reference numeral 11 and is mounted on the transom 12 of a watercraft 13. The invention is described in conjunction with an outboard motor because outboard motors present certain problems particularly dealing with the exhaust back pressure which can be addressed with this invention. It will be readily apparent, however, to those skilled in the art how the invention can be applied in a wide variety of other engine applications and also in engine applications wherein exhaust back pressure is not a determinative factor in the engine control.

The outboard motor includes a swivel bracket 14 that is pivotally connected to a mounting plate 15. The pivotal movement of the swivel bracket relative to the mounting plate 15 is about a pivot axis defined by a pivot pin 16. In addition, the mounting plate is adapted to be moved vertically relative to the hull so as to change the height H of a propeller 17, which is driven in a known manner, in the body of water in which the watercraft is operating. The outboard motor 11 also may have its trim adjusted as indicated by the arc B by a suitable and any well-known type of trim adjustment mechanism.

The outboard motor is adapted to be controlled remotely and a remote control, single-lever operator 18 is provided for this purpose that has a control lever 19. Rotational movement of the control lever 19 effects not only a change in the throttle position of the engine (the throttle valve will be discussed and described shortly) but also the condition of the transmission of the drive between the outboard motor powering engine. This engine is shown in detail in the remaining two views of this figure and is indicated generally by the reference numeral 21. The engine 21 has a driving connection to the propeller 17 for driving the propeller 17 in selected forward or reverse directions or for maintaining the outboard propeller 17 in neutral while the engine may rotate.

The single lever control 19 may also carry a trim control switch 22 by which the operator may remotely control the trim angle B. Any of the remote control trim mechanisms known in the art may be utilized for this purpose.

Although knowledge of the general details of the construction and operation of the outboard motor 11 are not necessary to permit those skilled in the art to understand and practice the invention, some of the details and particularly those dealing with the engine 21 will be described by primary reference to the remaining two views of this figure.

In the illustrated embodiment, the engine 21 is of a three-cylinder, in-line type. The engine 21 also operates on a two-stroke, crankcase compression principle. Although this type of engine is illustrated and will be described, it will be readily apparent to those skilled in the art how the invention may be practiced with engines having other cylinder numbers and other configurations and also with engines operating on a four-cycle principle.

Some of the problems which the invention solves are particular to two-cycle, crankcase compression engines and, therefore, the invention is described in conjunction with such an engine. Also and as will become apparent, certain features of the invention have particular utility with multiple cylinder engines and, although the invention is not so limited, a multiple cylinder engine is described for this reason.

The engine 21 is comprised of a cylinder block 23 having a cylinder head 24 affixed thereto. The cylinder block 23 is formed with three horizontally-extending, vertically-spaced cylinder bores 25. Pistons 26 reciprocate in each of the cylinder bores 25. Each piston is connected to the small end of a connecting rod 27. The big ends of the connecting rods 27 are journaled on the throws of a crankshaft 28 in a well known manner.

The crankshaft 28 rotates in a crankcase chamber 29 that is formed by a crankcase member 31 that is affixed to the cylinder block 23 and, in part, by the skirt of the cylinder block 23. As is typical with two-cycle crankcase compression engines, the crankcase chambers 29 associated with each of the cylinder bores 25 are sealed one from the other.

An induction and charge-forming system, indicated generally by the reference numeral 32 is provided for supplying a fuel/air charge to the crankcase chambers 29. Although the invention is described in conjunction with specific type of fuel/air charging system, it will also be readily apparent to those of skill in the art how the invention may be utilized with various other types of fuel and air charging systems.

The air and fuel charging system 32 includes an intake manifold 33 that receives atmospheric air at an air inlet 34 in which a throttle valve 35 is positioned. As previously noted, the throttle valve 35 has its position controlled by the single lever control.

The intake manifold 33 discharges into the crankcase chambers 29 through an intake port in which a reed-type check valve 36 is positioned. The reed-type check valve 36 functions to permit the air and fuel to flow into the crankcase chambers 29 when the pistons 26 are moving upwardly in their cylinder bores 25. As the pistons 26 move downwardly to compress the charge in the crankcase chambers 29, these reed-type check valves 36 close to preclude reverse flow.

The air/fuel charging system 32 also includes a fuel injection system of the manifold type. This fuel injection system includes a fuel injector 37 which is electronically operated and which sprays fuel into the intake passage of the manifold 33 upstream of the reed-type check valve 36.

Fuel is supplied to the fuel injectors 37 by a fuel supply system that includes a remotely positioned fuel tank 38. Fuel is drawn from the fuel tank 38 through a conduit 39 by means that include a high pressure fuel pump 41 which, in turn, delivers the fuel to a fuel rail 42 through a supply conduit 43. The pressure of the fuel in the fuel rail 42 is controlled by a pressure-responsive valve 44. Pressure is controlled by dumping excess fuel back into the fuel system, for example, to the fuel tank 38 through a return conduit 45.

The fuel/air charge which is compressed in the crankcase chambers 29 is transferred to combustion chambers 46 formed by the cylinder bore 25, heads of the pistons 23 and cylinder head 24 through one or more scavenge passages 47. This charge which has been thus transferred is then fired by means of a spark plug 48 mounted in the cylinder head 24. There is, of course, one spark plug 48 for each cylinder bore 25.

The spark plugs 48 are fired by a suitable ignition system which is triggered and fired under the control of an ECU, indicated generally by the reference numeral 49 in accordance with a strategy which will be described.

In order to control not only the firing of the spark plugs 48 but also the air/fuel ratio by controlling the amount of fuel injected by the injector 37, the ECU receives control signals from a wide variety of sensors of both engine and ambient conditions. These sensors include an in-cylinder pressure sensor 51 that is mounted in the cylinder head 24 and which outputs its signal to the ECU 49 through a suitable conductor indicated schematically in FIG. 1. This is the case with all other sensors and, therefore, the specific manner of connection of those sensors to the ECU 49 will not be described in particular detail.

The sensors further include a knock sensor 52. An engine temperature signal is provided by an engine temperature sensor 53 that senses the temperature in the engine cooling jacket. In order to measure the air flow to the engine 21, a system is employed which measures crankcase pressure at a specific crank angle. It has been determined that under many engine running conditions the actual air flow volume may be accurately determined in this manner.

Therefore, there is provided a crankcase pressure sensor 54 and a crank angle position sensor 55. The signal from the crank angle sensor 55 is also utilized in the spark timing control, injection timing control and other controls. This also provides an indication of engine speed by measuring the pulses in a given time period.

The temperature of the air or intake air temperature is sensed by a sensor 56, which is also positioned in the engine crankcase chamber 29.

A throttle valve position sensor 57 provides an indication of the operator demand or load on the engine by determining the position of the throttle valve 35.

The exhaust gases which are generated by the combustion in the combustion chamber are discharged from the combustion chamber through exhaust ports 58. These exhaust ports 58 all communicate with an exhaust manifold 59 that is formed, in part, integrally within the cylinder block 23 and which extends downwardly. As is typical with outboard motor practice, this exhaust manifold 58 communicates with an exhaust pipe 61 that depends into an expansion chamber formed internally within the drive shaft housing lower unit assembly 62 of the outboard motor 11.

A through-the-propeller underwater exhaust gas discharge 63 discharges the exhaust gases to the atmosphere through the body of water in which the watercraft is operating under normal high-speed engine running conditions. Hence, the back pressure that exists also is determinative of engine running conditions and desired air-fuel ratio and spark timing, as will be described. Therefore, a back pressure sensor 64 is mounted in the expansion chamber formed by the drive shaft housing 62 and outputs its signal to the ECU 49.

In addition to the engine operating conditions as noted, certain ambient conditions are also important in the control for the engine systems. Hence, atmospheric pressure signals are transmitted from a suitable sensor to the ECU. In addition, the temperature of the water in which the outboard motor 11 is operating and which is drawn in for engine cooling is measured by a suitable sensor. This signal is also transmitted to the ECU 49.

Other conditions which are important in the engine control are also the speed of the watercraft 13, and therefore the watercraft is provided with a speed sensor. The output signal from the watercraft speed sensor is also transmitted to the ECU 49.

The condition of the transmission that connects the engine 21 to the propeller 17 is also important, and a neutral detector switch outputs a signal to the ECU 49 for detecting and indicating this condition.

The trim angle also is important because its angle affects, among other things, the back pressure existent at the underwater exhaust discharge 63. Hence, a trim angle sensor 65 is provided at the swivel bracket 14, and it outputs its signal to the ECU 49.

Finally, the vertical height achieved by the lift mechanism in the direction H is also important because this will also affect back pressure. A lift position sensor 66 is associated with the lift plate 15, and it outputs its lift signal to the ECU 49.

Most importantly, at least in accordance with certain facets of the invention, the control for the air-fuel ratio of the engine is of the feedback type, and hence an air-fuel ratio sensor is supplied. In the specific embodiment, this sensor is an oxygen ($o_2$)sensor, indicated by the reference numeral 67, and outputs a signal indicative of the amount of oxygen in the combustion gases. This has been found to provide a more accurate signal of actual instantaneous air-fuel ratio than other types of sensors. This sensor 67 is provided in a conduit 68 that is associated with the engine so as to sample primarily the exhaust gases from one cylinder of the engine so as to provide the control data.

Many of the conditions sensed may not be necessary to practice the invention, as will become apparent. However those conditions which are employed with conventional control systems have been described so that those skilled in the art will understand how the invention may be practiced with conventional systems.

The basic control strategy by which the air-fuel ratio is maintained at a desired ratio may be of any type known in the art. Primarily, it is desirable to maintain the air-fuel ratio at a stoichiometric ratio when the oxygen or λ sensor outputs a unitary signal. This invention deals primarily with the way of maintaining a uniform speed during this control strategy when adjustments are being made. Therefore, the basic control strategy by which the feedback control operates will not be described, but the description will be limited to that of the transient condition. However, it is important to understand the basic way in which feedback controls operate in order to understand the importance of the concept of this invention.

Basically, a feedback control system operates by setting a fixed air-fuel ratio that is controlled primarily by adjusting the duration of injection of the fuel injectors 37 if this is the type of charge-forming system employed. By varying the duration of injection, the amount of fuel injected is varied, and accordingly, the air-fuel ratio will be adjusted.

Thus, if the oxygen sensor 67 indicates the engine is running lean, with more air and/or less fuel than required for stoichiometric, the amount of fuel injected is increased. On the other hand, if the engine is running rich, too much fuel for the air flow, then the amount of fuel injected is decreased. However, the mere change in the amount of fuel injected, with all other factors being held constant, may result in a change in actual engine speed.

Figure 2:
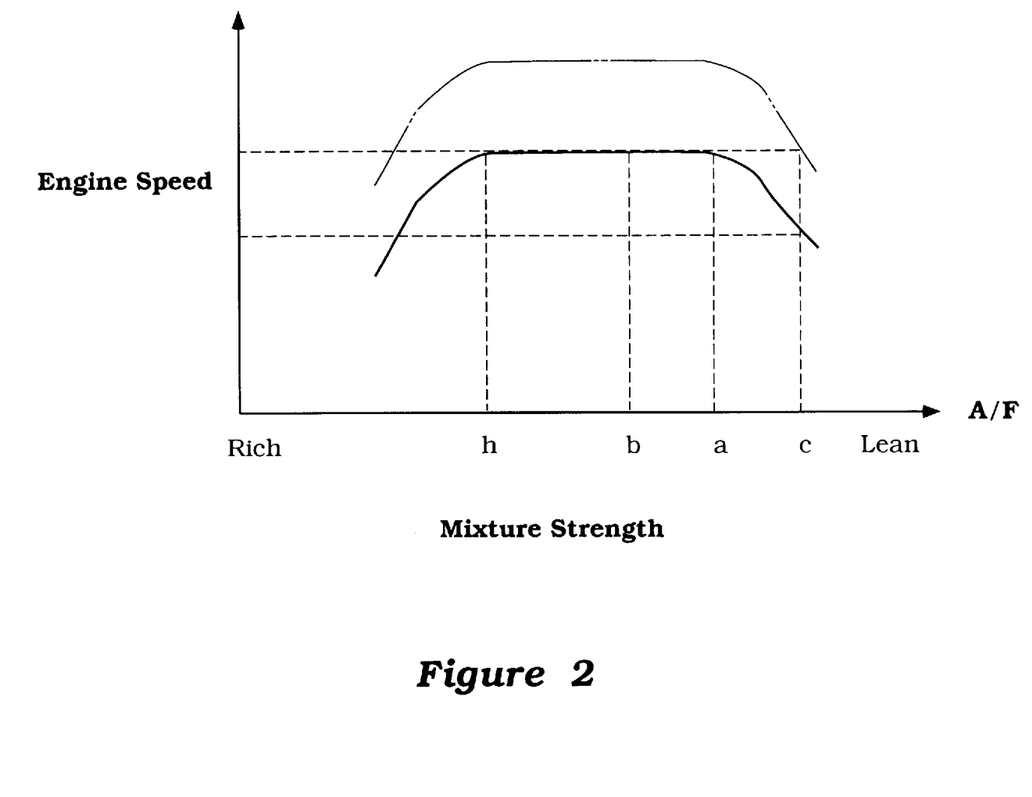
FIG. 2 is a graphical view showing the effect of variations in mixture strength and spark timing on the engine speed.

This condition may be understood by reference to FIG. 2, which shows the effect of variations in air-fuel ratio on actual engine speed with all other conditions held fixed. It will be seen that when the mixture strength is in the range from a to h, which includes the stoichiometric point b, the engine speed does not vary. However, if the richness in the mixture is increased beyond the point at h or decreased beyond the point at b, the engine speed will actually decrease. Therefore, if the feedback system calls for a change in air-fuel ratio from the point a to the point c, the engine speed will actually fall.

Figure 3:
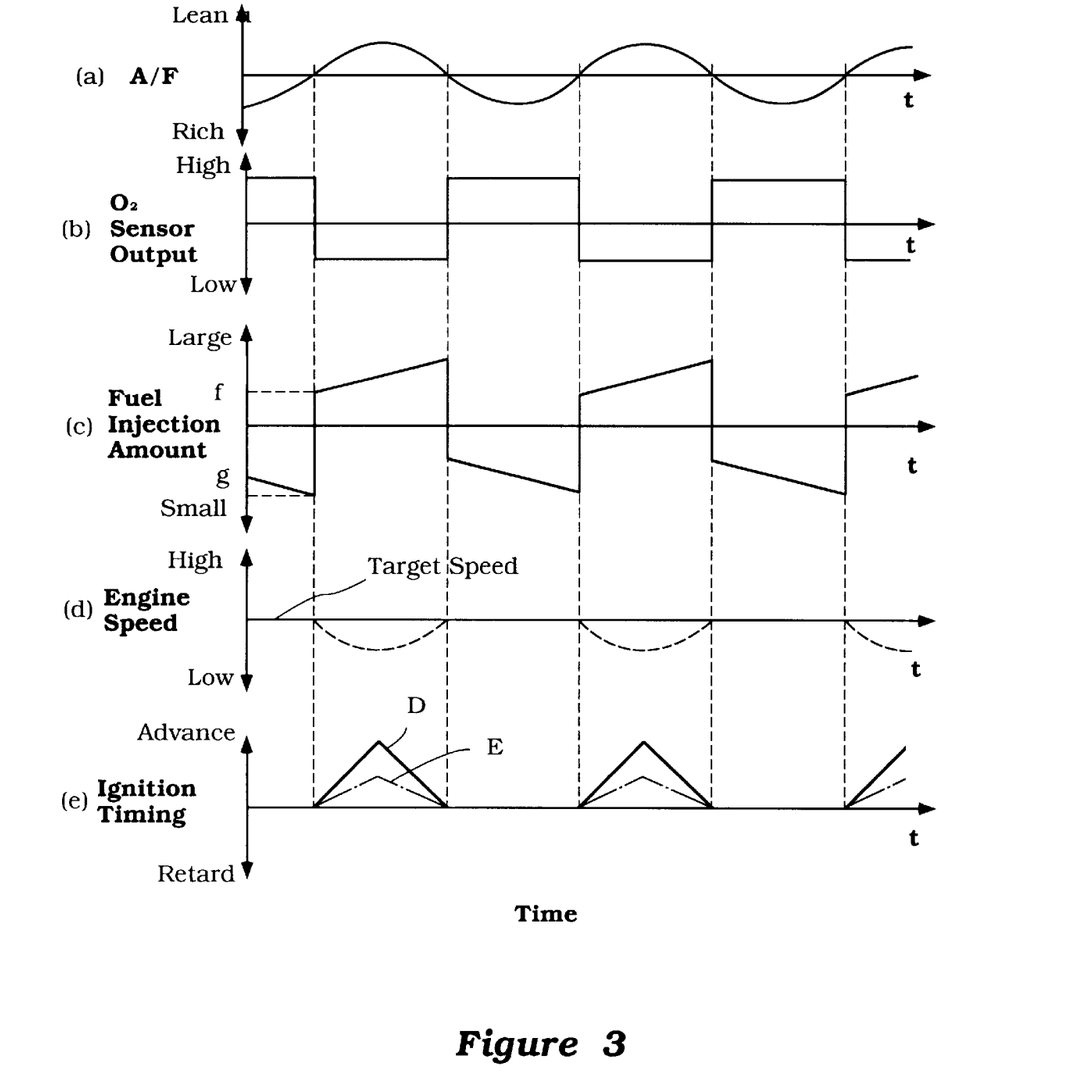
FIG. 3 is a graphical view showing a control cycle of operation and indicating the variations in air/fuel ratio, oxygen sensor output, fuel injection amount, engine speed and ignition timing during the control cycle.

This condition also may be understood by reference to FIG. 3, which shows a variety of curves in relation to time during a control cycle. The top curve a shows the air-fuel ratio, while the second curve b shows the oxygen sensor output from the sensor 67. As may be seen, as the system operates to correct the mixture to stoichiometric from rich toward lean, the oxygen sensor output will go from a high output to a low or no output when the mixture crosses the stoichiometric point.

With a conventional feedback control, therefore, the fuel injection amount is varied, as shown by the curve c. During the initial period when the mixture has been indicated as being rich, the fuel injection amount will be gradually decreased until the mixture becomes stoichiometric and the output signal from the $O_2$ sensor discontinues. When this occurs, the system automatically increases the amount of fuel injected in a single relatively large step, as shown by the differential amount f–g in FIG. 3. As a result of this, the engine speed will tend to decrease, as shown by the phantom line curve in curve d.

In accordance with the invention, the engine speed is maintained constant by changing the spark timing. Referring again to FIG. 2, the phantom line curve shows how, with the same mixture strength, the engine speed can be increased by advancing the spark timing. Therefore, if at a condition where the mixture was at the point a on the solid line curve and the amount of fuel injected was changed to the point c to maintain the air-fuel ratio as desired, the engine speed would fall if all other factors were constant.

However, by advancing the spark timing, in accordance with the invention, to the point shown on the phantom curve the same engine speed can be maintained. In this way, the target engine speed can be maintained during the feedback control.

Figure 4:
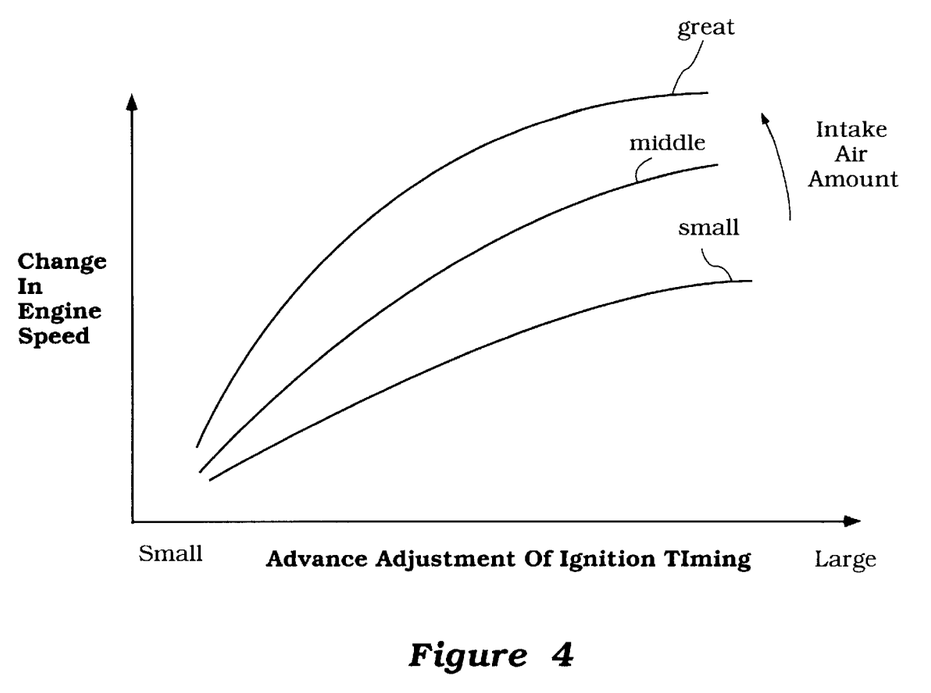
FIG. 4 is a graphical view showing the effect of intake air amount and spark advance adjustment of ignition timing on engine speed.

It has also been discovered that the ideal amount of spark advance to maintain engine speed will be dependent upon the actual intake air flow to the engine. This may be understood by reference to FIG. 4, which shows the effect of changes in spark timing and their effect on changes in engine speed. As may be seen, when the engine intake air amount is large, a given change in spark timing will have a larger effect on the actual engine speed than when the intake air amount is low.

Figure 5:
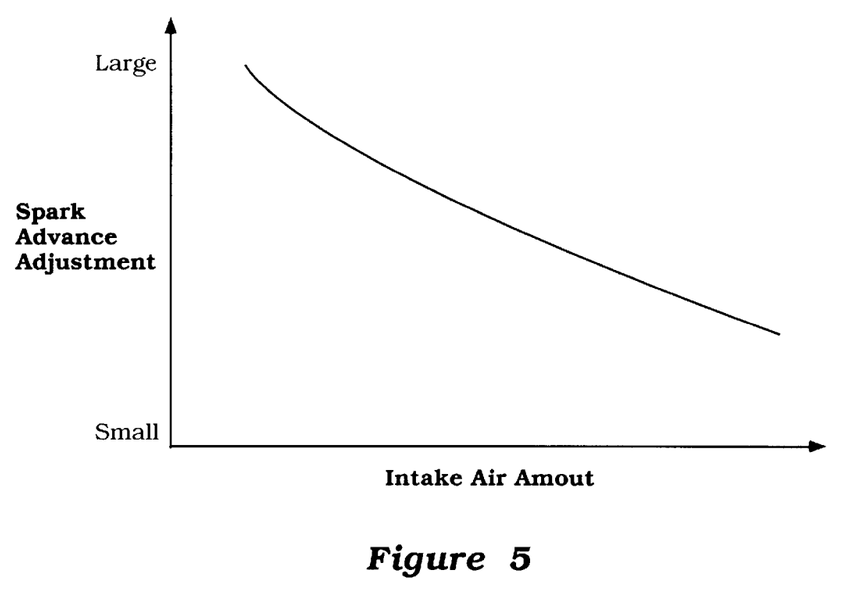
FIG. 5 is a graphical view showing the relationship of spark advance adjustment in relation to intake air amount.

Therefore, in accordance with a feature of the invention, a spark advance adjustment is set that is dependent upon intake air amount, as shown in FIG. 5. This incremental amount is then programmed into a map, which forms a part of the memory of the ECU 49.

Figure 6:
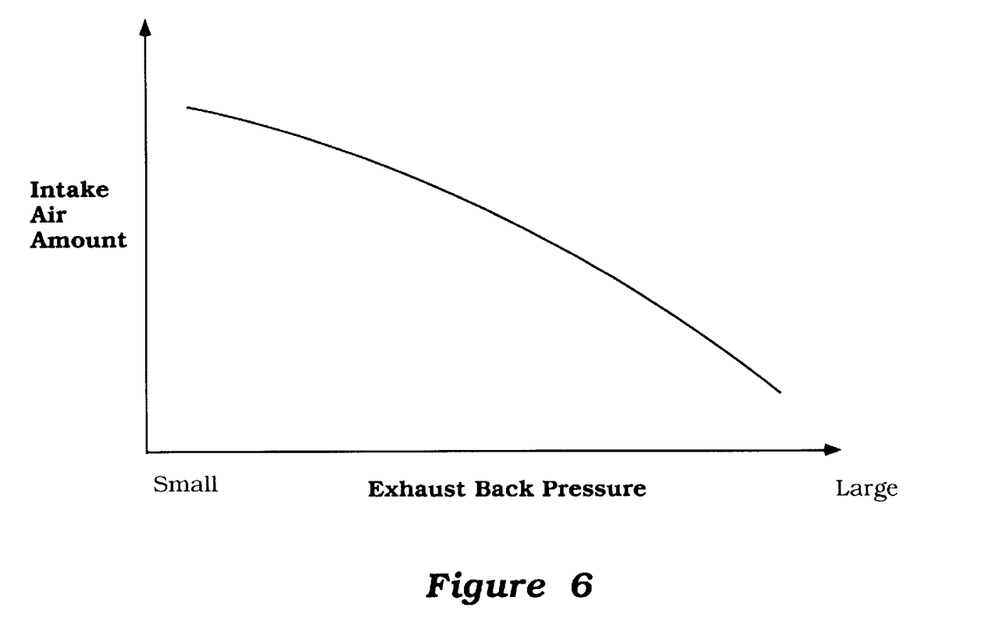
FIG. 6 is a graphical view showing the effect of exhaust gas back pressure upon the amount of air inducted.
Figure 7:
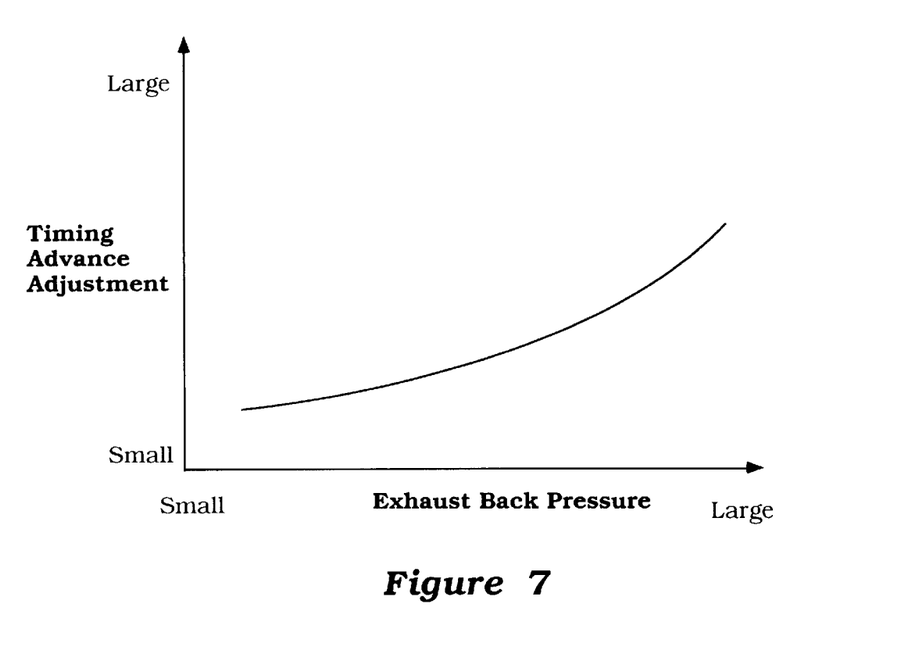
FIG. 7 is a graphical view showing the effect of exhaust back pressure on the desired spark timing advance adjustment.

Also, it has been determined that exhaust back pressure has an effect on the intake air amount as may be seen from FIG. 6. As the exhaust back pressure increases, the intake air amount will decrease. Therefore, the timing adjustment may also be varied in response to exhaust back pressure, as shown in FIG. 7. Again, this data can be programmed as a map into the memory of the ECU 49.

It is to be understood that the control strategy may be based either on the measurement of intake air amount or upon the exhaust gas back pressure. Alternatively, the combination of these two corrections may be made.

Referring again to FIG. 3, the curve D shows the variation in spark timing that will be made to maintain the engine speed constant if there is a small intake air amount, while the curve E shows the adjustment to be made if there is a large intake air amount.

Figure 8:
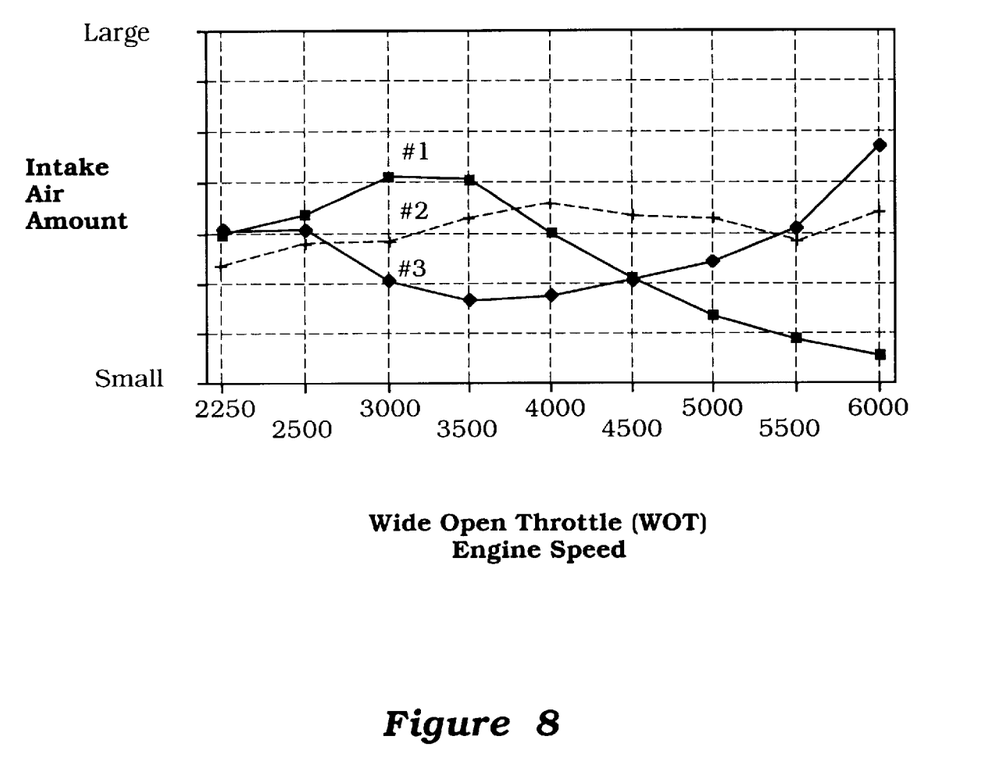
FIG. 8 is a graphical view showing the intake air amount for each cylinder of the three cylinder engine at varying engine speeds when operating under wide open throttle conditions.

The actual amount of air flow to each cylinder depends upon that cylinder's particular location due to the fact that the exhaust system is such that the exhaust ports 58 of the various cylinders 1, 2, and 3 are at different distances from the end of the exhaust pipe 61. FIG. 8 is a graphical view showing the intake air amount flowing to each cylinder at various engine speeds under wide open throttle conditions. Thus the adjustments made for each cylinder may be different. This can be reflected in individual control maps for each cylinder Such maps are programmed into the ECU and utilized to provide the individual adjustment of spark timing and fuel injection amount for each cylinder.

Figure 9:
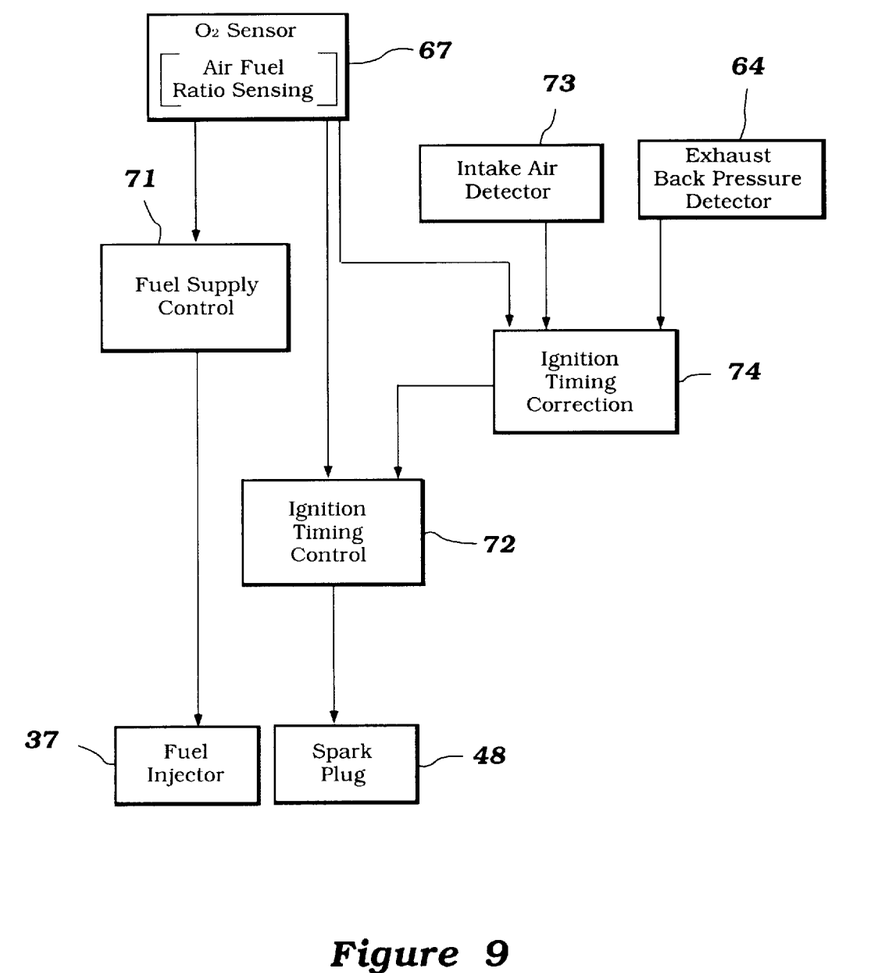
FIG. 9 is a block diagram showing the relationship of the various controls and detectors to the engine spark plug and fuel injector.

The relationship between the various sensors in the actual construction and components of the engine is illustrated in FIG. 9. In this figure it will be seen that the air-fuel ratio detection sensor or oxygen sensor 67 outputs its signal to a fuel supply control, indicated schematically at 71, and which forms a portion of the ECU 49 which supplies the control signal to the fuel injector 37. In addition, the oxygen or air-fuel ratio sensor 67 outputs its signal to an ignition timing control section 72 of the ECU. The ignition timing control 72 controls the time of firing of the spark plug 48, as aforenoted.

In addition, the ECU includes an intake air amount detecting circuit 73 which, as has been noted, operates to use the output from the crankcase pressure sensor 54 at the appropriate crank angle to provide a signal indicative of the actual amount of intake air flow. It should be noted at this point that other forms of intake air detectors may be employed, such as hot wire sensors, etc.

In addition, the back pressure signal from the sensor 64 is also collected, and these two signals, as well as a further signal from the oxygen or air-fuel ratio sensor 67, are supplied to a further circuit 74 of the ECU, which is the ignition timing adjusting circuit.

Figure 10:
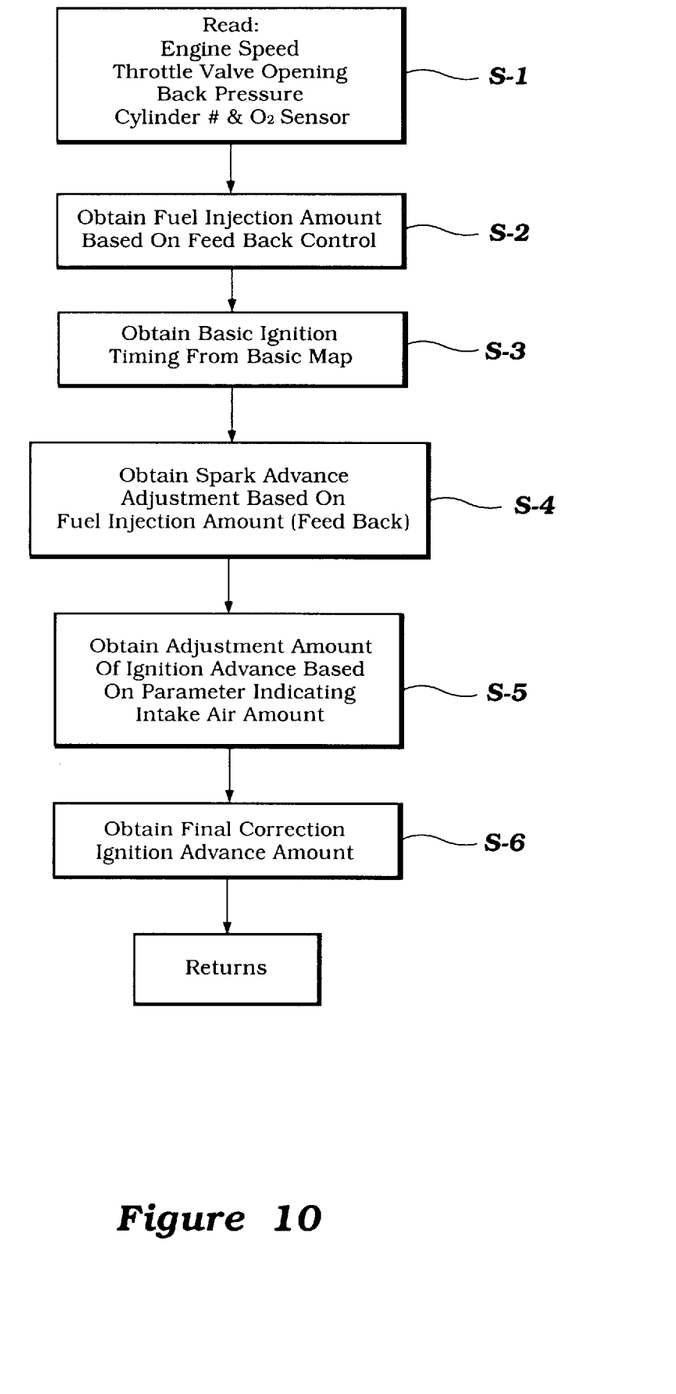
FIG. 10 is a block diagram showing the control routine by which the amount of spark advance is adjusted during feedback control in accordance with an embodiment of the invention.

Having this background in mind, the actual control routine will now be described by reference to FIG. 10 When the program starts, it moves to the step S1, wherein certain readings are taken. Specifically the engine speed which, as has been noted, is determined by measuring the output pulses from the crankshaft position sensor 55 for a given time period; the throttle valve opening is determined by the throttle position sensor 57; the engine exhaust gas back pressure is determined by the sensor 64; and the specific cylinder in question which is being controlled is detected. Also, the output of the oxygen sensor 67 is sensed so as to determine if the engine is operating in a condition where adjustment in the amount of fuel supplied is required.

Having these readings, the program then moves to the step S2 so as to obtain a fuel injection amount based upon the feedback control signal.

The program then moves to the step S3 to obtain the basic ignition timing for firing the spark plug 48 from a basic map based upon the criteria employed. Generally, this will be engine speed and/or load.

The program then moves to the step S4 so as to obtain the basic spark advance based purely on the fuel injection amount, that is, based upon the feedback signal indicated at the step S2.

The program then moves to the step S5 so as to obtain from a further map the amount of spark advance adjustment based upon a parameter that indicates intake air flow amount. This will be the amount of adjustment determined by a map like the map of FIG. 5 and which is memorized in the memory of the ECU 49.

As has been previously noted, the intake air amount may also be determined by the measurement of exhaust back pressure from a determination, as shown in FIG. 6, and then the timing adjustment will be based upon a map like that of FIG. 7.

The program then moves to the final step S6, wherein then final advance adjustment amount is determined by taking the basic timing adjustment S4 and modifying it by the corrective factors determined at steps S4 and S5. The final ignition advance adjustment is then made, and the program returns.

From the foregoing description, it should be readily apparent that the described embodiment of the invention is particularly effective in providing good feedback control for the air-fuel ratio of an engine, while at the same time minimizing the effect of changes in the air-fuel fuel ratio on the engine speed so as to minimize fluctuations in engine speed. Of course, the foregoing description is that of preferred embodiments of the invention, and various changes and modifications may be made without departing from the spirit and scope of the invention, as defined by the appended claims.

What is claimed is:

1. An internal combustion engine and control system therefor, said engine being formed with at least one combustion chamber, an air-fuel charging system for supplying an air-fuel charge to said combustion chamber for combustion therein, a spark plug having a gap extending into said combustion chamber, an ignition control system including timing means for firing said spark plug at a timing dependent upon at least one engine condition for initiating combustion in said combustion chamber, an exhaust port for discharging combustion products from said combustion chamber, an exhaust system communicating said exhaust port with the atmosphere for discharge of exhaust gases to the atmosphere, an air-fuel ratio sensor for sensing the air-fuel ratio supplied to said combustion chamber, an air flow sensor for providing a signal indicative of the air flow to said combustion chamber, a feedback control system for adjusting the air-fiel ratio in response to the output of said air-fuel ratio sensor for maintaining the desired air-fuel ratio in said engine, said ignition control system including means for varying the timing of firing of said spark plug in response to changes in the air-fuel ratio and adjusting the varying of the timing in resonse to the amount of air flow as sensed by said air flow sensor for minimizing variations in engine speed.

2. An internal combustion engine and control system as set forth in claim 1, wherein the spark timing is advanced when the air-fuel ratio is adjusted to provide an increase in the amount of fuel supplied.

3. An internal combustion engine and control system as set forth in claim 1, wherein the amount of change in spark timing is also varied dependent upon another engine running condition than air flow.

4. An internal combustion engine and control system set forth in claim 3, wherein the other engine running condition speed.

5. An internal combustion engine and control system set forth in claim 3, wherein the other engine running condition load.

6. An internal combustion engine and control system as set forth in claim 3, wherein the other engine running condition comprises exhaust back pressure in the exhaust system.

7. An internal combustion engine and control system as set forth in claim 1, wherein the engine is provided with a plurality of cylinders.

8. An internal combustion engine and control system as set forth in claim 7, wherein the amount of change in spark timing for at least one of the cylinders differs from the others depending upon an engine running condition.

9. An internal combustion engine and control system as set forth in claim 7, wherein the amount of change in spark timing is also dependent upon another engine running condition than air flow.

10. An internal combustion engine and control system as set forth in claim 9, wherein the other engine running condition is speed.

11. An internal combustion engine and control system as set forth in claim 9, wherein the other engine running condition is load.

12. An internal combustion engine and control system as set forth in claim 9, wherein the other engine running condition comprises exhaust back pressure in the exhaust system.

13. An internal combustion engine and control system as set forth in claim 12, wherein the engine is utilized in a marine propulsion system and the exhaust system discharges the exhaust gases below the level of water in which the watercraft is operating.

14. An internal combustion engine and control system as set forth in claim 15, wherein the marine propulsion system comprises an outboard motor and wherein the combustion chambers are positioned one vertically above the others and the exhaust system collects the exhaust gases from all of the exhaust ports so that a different length exists between the exhaust port and the outlet of the exhaust system for each combustion chamber.

15. An internal combustion engine control method, said engine being formed with at least one combustion chamber, an air-fuel charging system for supplying an air-fuel charge to said combustion chamber for combustion therein, a spark plug having a gap extending into said combustion chamber, an ignition control system including timing means for firing said spark plug at a timing dependent upon at least one engine condition for initiating combustion in said combustion chamber, an exhaust port for discharging combustion products from said combustion chamber, an exhaust system communicating said exhaust port with the atmosphere for discharge of exhaust gases to the atmosphere, an air-fuel ratio sensor for sensing the air-fuel ratio supplied to said combustion chamber, an air flow sensor for sensing the air flow to said combustion chamber, and a feedback control system for adjusting the air-fuel ratio in response to the output of said air-fuel ratio sensor for maintaining the desired air-fuel ratio in said engine, said method comprising the step of varying the timing of firing of said spark plug when changes are made in the air-fuel ratio by the feed back control for minimizing variations in engine speed and adjusting the amount of timing adjustment in response to the air flow.

16. An internal combustion engine control method as set forth in claim 15, wherein the spark timing is advanced when the air-fuel ratio is adjusted in a direction to increase the amount of fuel supplied.

17. An internal combustion engine control method as set forth in claim 15, wherein the amount of change in spark timing is also dependent upon another engine running condition other than air flow.

18. An internal combustion engine control method as set forth in claim 17, wherein the other engine running condition is speed.

19. An internal combustion engine control method as set forth in claim 17, wherein the other engine running condition is load.

20. An internal combustion engine control method as set forth in claim 17, wherein the other engine running condition comprises exhaust back pressure in the exhaust system.

21. An internal combustion engine control method as set forth in claim 15, wherein the engine is provided with a plurality of cylinders.

22. An internal combustion engine control method as set forth in claim 21, wherein the amount of change in spark timing for at least one of the cylinders differs from the others depending upon an engine running condition.

23. An internal combustion engine control method as set forth in claim 22, wherein the amount of change in spark timing is also dependent upon another engine running condition other than air flow.

24. An internal combustion engine control method as set forth in claim 23, wherein the other engine running condition is speed.

25. An internal combustion engine control method as set forth in claim 23, wherein the other engine running condition load.

26. An internal combustion engine control method as set forth in claim 23, wherein the engine running condition comprises induction system air flow.

27. An internal combustion engine control method as set forth in claim 23, wherein the other engine running condition comprises exhaust back pressure in the exhaust system.

28. An internal combustion engine control method as set forth in claim 27, wherein the engine is utilized in a marine propulsion system and the exhaust system discharges the exhaust gases below the level of water in which the watercraft is operating.

29. An internal combustion engine control method as set forth in claim 28, wherein the marine propulsion system comprises an outboard motor and wherein the combustion chambers are positioned one vertically above the others and the exhaust system collects the exhaust gases from all of the exhaust ports so that a different length exists between the exhaust port and the outlet of the exhaust system for each combustion chamber.

* * * * *

UNITED STATES PATENT AND TRADEMARK OFFICE
CERTIFICATE OF CORRECTION

PATENT NO. : 5,769,053
DATED : June 23, 1998
INVENTOR(S) : Nonaka

It is certified that error appears in the above-identified patent and that said Letters Patent is hereby corrected as shown below:

Column 9,
Line 24, please change "in resonse to" to -- in response to --.
Line 35, please change "condition speed" to -- condition is speed --.
Line 38, please change "condition load" to -- condition is load --.

Column 10,
Line 7, please change "claim 15" to -- claim 13 --.

Column 11,
Line 5, please change "condition load" to -- condition is load --.

Signed and Sealed this

Fifteenth Day of October, 2002

*Attest:*

JAMES E. ROGAN
*Attesting Officer*   *Director of the United States Patent and Trademark Office*